United States Patent
Bailey et al.

(10) Patent No.: US 9,599,259 B2
(45) Date of Patent: Mar. 21, 2017

(54) OILFIELD THREADED CONNECTIONS

(75) Inventors: Andyle Gregory Bailey, Kingwood, TX (US); Steven C. Langford, Magnolia, TX (US)

(73) Assignee: VAM USA, LLC, Houston, TX (US)

( * ) Notice: Subject to any disclaimer, the term of this patent is extended or adjusted under 35 U.S.C. 154(b) by 1466 days.

(21) Appl. No.: 11/754,529

(22) Filed: May 29, 2007

(65) Prior Publication Data

US 2008/0296894 A1 Dec. 4, 2008

(51) Int. Cl.
*F16L 15/00* (2006.01)
*E21B 17/042* (2006.01)

(52) U.S. Cl.
CPC .......... *F16L 15/002* (2013.01); *E21B 17/042* (2013.01); *F16L 15/004* (2013.01)

(58) Field of Classification Search
USPC ................................................. 285/333, 334
See application file for complete search history.

(56) References Cited

U.S. PATENT DOCUMENTS

| | | | |
|---|---|---|---|
| 3,989,284 A | 11/1976 | Blose | |
| 4,425,715 A * | 1/1984 | Willis et al. | 33/199 R |
| 4,629,224 A * | 12/1986 | Landriault | 285/334 |
| 4,705,307 A | 11/1987 | Chelette | |
| 4,753,460 A | 6/1988 | Tung | |
| 4,795,200 A * | 1/1989 | Tung | 285/334 |
| 5,462,315 A | 10/1995 | Klementich | |
| 6,322,110 B1 | 11/2001 | Banker et al. | |
| 6,481,760 B1 | 11/2002 | Noel et al. | |
| 6,581,980 B1 | 6/2003 | De Lange et al. | |
| 7,066,499 B2 | 6/2006 | Della Pina et al. | |
| 2002/0033603 A1 | 3/2002 | Pallini, Jr. | |
| 2004/0090068 A1* | 5/2004 | Evans et al. | 285/382 |
| 2008/0238094 A1 | 10/2008 | Craig et al. | |

FOREIGN PATENT DOCUMENTS

EP 0454148 10/1991

* cited by examiner

*Primary Examiner* — Daniel P Stodola
*Assistant Examiner* — Fannie Kee
(74) *Attorney, Agent, or Firm* — Bushman Werner, P.C.

(57) ABSTRACT

A threaded oilfield tubular connection includes a box connector (12) having internal threads (16, 18) and a pin connector (14) having external threads (22, 24) for mating with the internal threads. Each of a box torque shoulder (20) and a pin torque shoulder (26) may be negative angle shoulders, and the thread flanks on the internal and external threads may also be negative angle load flanks. The connector substantially maintains a desired preload when dope is trapped between the threads during makeup. Another embodiment provides positive angle torque shoulders and positive angle load flanks.

20 Claims, 2 Drawing Sheets

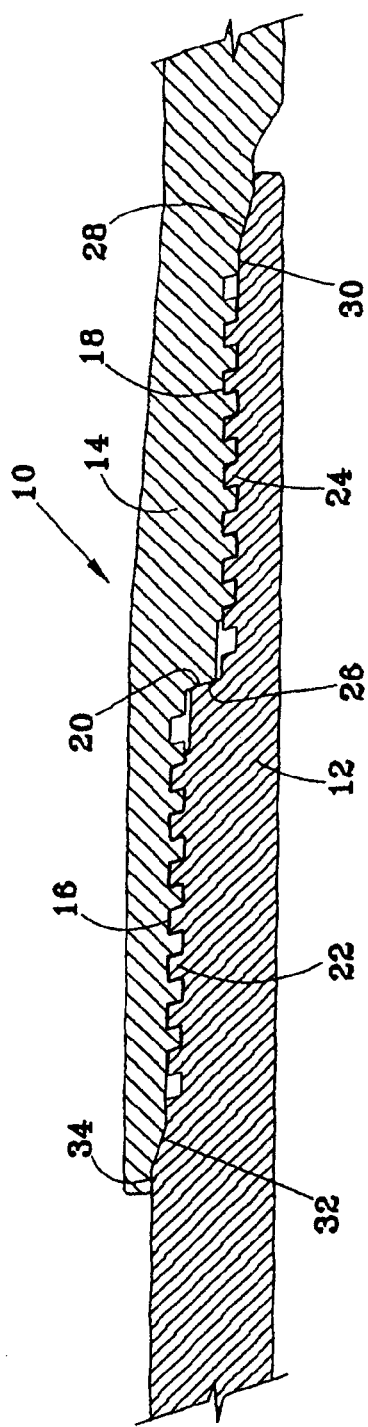
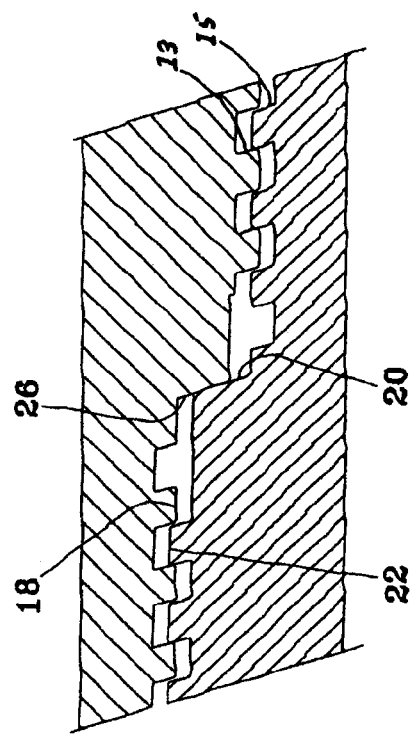
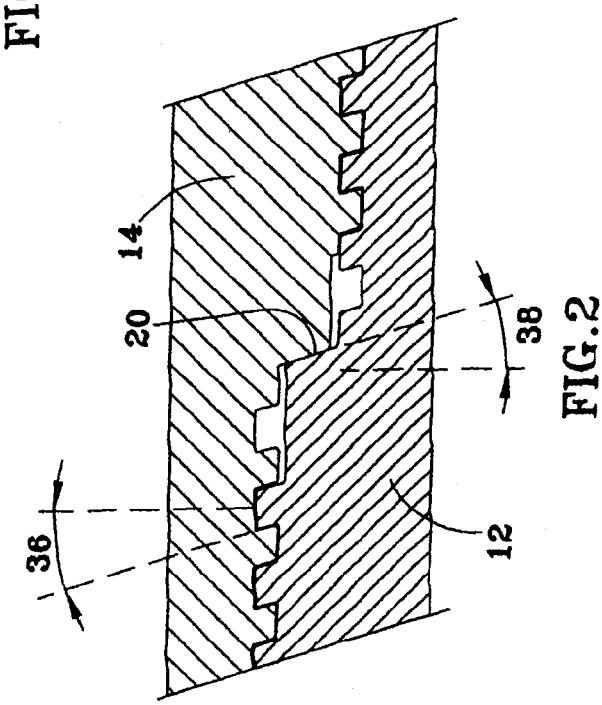

OILFIELD THREADED CONNECTIONS

BACKGROUND OF THE INVENTION

1. Field of the Invention

The present invention relates to oilfield threaded connections of the type having an engaging torque shoulder. More particularly, the present invention relates to an oilfield threaded connection in which the thread load flank is at a slightly negative angle, and the torque shoulder is at a similar negative angle. This combination minimizes the loss of preload when high pressure develops in the connection due to entrapped thread compound.

2. Description of the Related Art

Offshore drilling using automated handling and makeup systems have led to connections which are prepared with thread compound either on the shore base or on the rig prior to being taken up to the draw works for running the tubular string downhole. While the above techniques desirably place employees out of harms way, these techniques preclude the ability to apply the "human touch" as to proper thread compound application. Accordingly, the connection's sensitivity to having excess thread compound applied is significantly higher with the modern approaches of running pipe.

Threaded connections with seals adjacent each end for both internal and external pressure sealing tend to trap the thread compound between the seals. Seals are desirable to obtain the capabilities needed for pressure reversal scenarios. Inadvertently, however, these seals also trap the pressure of the thread compound which is trying to escape the connection during makeup. Moreover, integral expanded box and liner connections, which commonly have this configuration, are oft times less robust than threaded and coupled connections due to limited material available driven by clearance issues which mandate their use.

Integral, tapered, two-step, negative load flank, dual seal connections exist in the market. One example is the Grant Prideco ANJO connection which has a negative load flank thread form, two-step thread, a 15° torque shoulder near the axial center of the connector, and both internal and external seals. Another connection is the Hydril SLX connection which also has a negative load flank thread form, two-step threads, a 15° torque shoulder near the axial center of the connector, and internal and external seals. For this latter case, the external seal is also mid-connector. A third connection with a negative load flank thread form and two-step threads is the VAM SLIJII connection, which has a torque shoulder near the axial center of the connector, substantially perpendicular to the axis of the connection, and also has internal and external seals. Integral, tapered, single step, negative load flank, dual seal connections also exist in the market. One example is the Hunting Seal Lock SF, which has a negative load flank thread form, single step threads, a 15° torque shoulder near the external face of the connector, and internal and external seals. Other similar connectors with flush or near flush outer diameter also exist.

One of the potential significant adverse effects of excess thread compound generating high pressures within the connector is loss of connection preload and stored torque when the compound pressure dissipates. The loss of stored torque is of significant concern in offshore drilling applications where the connector has the potential for unscrewing and disengaging during the running process. Making up a connection up to 30,000 ft. lbs and having it break out at 5,000 ft. lbs is particularly disconcerting for operators drilling 100 million dollar wells in 6,000 feet of water. By maintaining substantially the makeup torque and the preload, the reliability of the connection may be significantly improved.

U.S. Pat. No. 4,753,460 discloses a threaded connection with a negative load flank on two-step threads, a positive torque shoulder on the pin connector, and the box connector for high torque engagement. U.S. Publication 2002/0033603 discloses a threaded connection with conventional threads with rounded roots and a load shoulder between the end of the box and a mating surface on the pin. An end surface of the box member may also engage a mating surface on the pin member.

The disadvantages of the prior art are overcome by the present invention, and an improved oilfield tubular connection is hereinafter disclosed.

SUMMARY OF THE INVENTION

In one embodiment, the threaded oilfield tubular connection includes a box connector having internal threads and a box torque shoulder, and a mating pin connector having external threads and a pin torque shoulder for engagement with the box torque shoulder when the connection is made up. Each of the external threads and the internal threads have a thread load flank which is at a negative angle with respect to a central axis of the connection. Both the box torque shoulder and the pin torque shoulder have a similarly negative angle. Variations include a torque shoulder angle at a higher magnitude than the load flank angle. When excess dope is trapped between the threads, thread compound pressure is generated which may result in some radial separation of the pin and box member. In the event this pressure dissipates, this radial separation is reduced. If the thread load flank and torque shoulder angles are substantially parallel, the axial component of the contact force between the pin and box members remains constant and the stored torque is substantially unaffected. If the axial distance between the load flank and torque shoulder increases as radial separation of the pin and box members decreases due to a disparity in these angles, the axial component of the contact force could be increased as the potential energy of the trapped dope pressure is translated into additional mechanical preload resulting in additional stored torque.

In another embodiment, a threaded oilfield connection includes a box connector with internal threads and a box torque shoulder, and a pin connector with external threads and a pin torque shoulder. Each of the external threads and the internal threads has a thread load flank which is perpendicular to or at a positive angle with respect to a central axis of the connection; and, each of the box torque shoulder and the pin torque shoulder are also at a similar angle with respect to the central axis of the connection. Variations include a torque shoulder angle at a lesser magnitude than the load flank angle. A maximum variance between the pin load flank angle and the pin torque shoulder angle or between the box load flank angle and the box torque shoulder angle should generally be 5° or less.

These and further features and advantages of the present invention will become apparent from the following detailed description, wherein reference is made to the figures in the accompanying drawings.

BRIEF DESCRIPTION OF THE DRAWINGS

FIG. 1 illustrates one embodiment of a threaded connection according to the invention.

FIG. 2 is an enlarged view of a portion of the threads and the torque shoulders shown in FIG. 1.

FIG. 3 is an enlarged view of the threads and torque shoulders shown in FIG. 2 5 when the connection is subjected to internal pressure trapped between the threads.

DETAILED DESCRIPTION OF THE INVENTION AND THE PREFERRED EMBODIMENT

Figure 4:
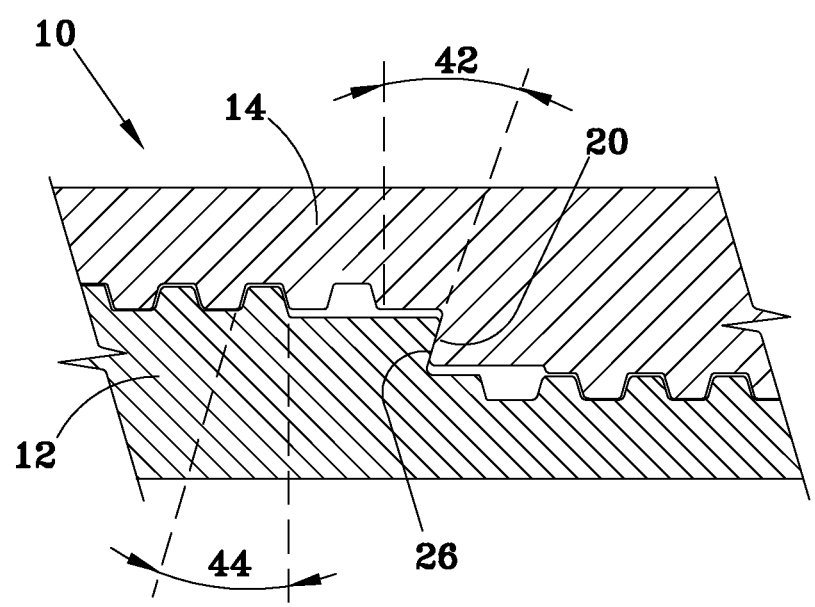
FIG. 4 is a partial cross-sectional view of another embodiment of a threaded connection according to the present invention with positive load flank threads and a positive torque shoulder.

Referring to FIG. 1, a threaded oilfield tubular connection 10 comprises a box 15 connector 14 having internal, tapered, two-step threads 16, 18, having load flank 13 (see FIG. 3 and a torque shoulder 20. A mated pin connector 12 has external, tapered, two-step threads 22, 24, having stab flank 15 (see FIG. 3), and a torque shoulder 26 for mating with the torque shoulder 20. In both the pin and box connectors, the torque shoulder is provided axially between thread steps, which are preferably provided on a slight taper and have a significant radial spacing between the 20 two steps of the threads. FIG. 1 also discloses a frustoconical sealing surface 28 on the box connector 14 which forms a metal-to-metal seal with the mating surface 30 on the pin connector 12, thereby preventing internal pressure from passing to the threads 18, 24. The pin connector 12 has a similar frustoconical surface 32 which mates with the surface 34 on the box connector 14 to similarly seal the threads 16, 22 from external fluid. When the connection 10 is made up, the external and internal seals trap fluid pressure between the seals and thus between the threads. When this trapped cavity is filled with lubricant or thread compound, commonly referred to as pipe dope, the pressure increases as the cavity reduces during final makeup of the connection, resulting in radial separation of the threads.

Referring still to FIG. 1, it should thus be understood that when high pressure develops within the connection due to the hydraulics of entrapped thread compound, there may be a significant loss of preload when said hydraulic pressure bleeds off. By using the features disclosed herein, the final preload may be substantially maintained once the fluid pressure due to the "overdoped" condition dissipates. These features are particularly advantageous for, but not limited to, an integral, tapered, two-step connection wherein a torque shoulder is spaced between the two thread steps of both the box connector and the pin connector, and which incorporates a negative load flank thread form. As disclosed subsequently, a key feature is that the negative torque shoulder and the negative load flank angle of the threads are parallel or have a slight angle disparity which prevents loss of preload and thus effectively maintains substantially the initial high preload while radial separation of the pin and box due to high dope pressure is converted into shoulder interference as the dope pressure dissipates. Also, the relative angle of a positive load flank and torque shoulder may be controlled to prevent axial disengagement during radial deflection, as shown in FIG. 4 and discussed below.

Referring now to FIG. 2, each of the two-step threads on both the pin connector and the box connector have a negative load flank angle 36, which preferably may vary in magnitude from about 1° to about 15°. A negative flank, or hooked thread, minimizes radial separation of the pin and box under tension and pressure loading in a manner well known for engaging connectors. The engaging torque shoulders between the pin and the box connectors is similarly a negative angle, as shown by the angle 38 in FIG. 2. The angle 38 for the torque shoulders preferably may vary in magnitude from about 1° to about 20° depending on the load flank angle. A slight differential between these angles allows the connection to energize axially due to the reaction forces of the shoulders energizing as the axial distance between the load flank and the torque shoulders increases as the radial separation decreases in response to reduced fluid (dope) pressure between the pin connector and the box connector. For many embodiments, the variance between the negative angle on the thread load flanks and the negative box and pin torque shoulder angles will be less than 5°, and in most applications the negative angle of the torque shoulder is substantially equal to or slightly greater in magnitude than the negative angle of the thread load flanks which may provide more axial overlap at the torque shoulder interface after dope pressure bleed off, such that the breakout torque may desirably be increased. Preferably each of the box torque shoulder and the pin torque shoulder have a negative angle within 1° of the negative thread load flank of the box connector and the pin connector. The thread load flanks of the box connector and the pin connector for many embodiments is a negative angle between about 3° and about 12°, and the box torque shoulder and the pin torque shoulder have a negative angle between about 3° and about 13°, such that the angle disparity between the torque shoulder and load flanks is essentially equal to 1°. Each of the stab flanks on the internal threads and the external threads preferably is at a positive angle, but various desired stab flank angles may be used according to the invention. Stab flank angles may be positive, negative or neutral according to the present invention.

According to some prior art connections, a dovetail is effectively developed between the load flanks and the torque shoulders. This dovetail de-energizes when the radial deflection induced by the thread compound pressure decreases. The existence of this pressure increase and the subsequent drop of pressure within the connection during and after makeup has been measured at up to 10,000 psi. In the "overdoped" condition, the pin and the box radially separate, and when the fluid pressure is reduced, there is a significant loss in the initial preload. According to the present invention, an overdoped condition still results in radial separation between the pin connector and the box connector, as shown in FIG. 3. In this case, however, when fluid pressure is relieved, the radial separation decreases, and the connection reverses down the torque shoulders and the load flanks resulting in the connector having a equal or higher preload, rather than the significant reduction in preload that occurs in many prior art connections. By providing a torque shoulder with a negative angle, when coupled with the load flanks also being at a negative angle, the connection is much less susceptible to reduced preloading when there is excess thread compound between the threads. The term "negative" angle as used herein, means that the surface on the box connector, which is conventionally made up with a pin connector above the box connector, has a slight downward slope compared to a line perpendicular to the central axis of the connection, rather than having an upward slope which is conventional in public domain American Petroleum Institute connectors with positive load flanks, such as buttress and 8 round threads. Similarly, a negative surface on the pin connector is tapered slightly downward for mating engagement with the respective surface on the box connector. Both load flanks are angled slightly downward and are maintained within a fairly close tolerance of less than a degree. Also, it is preferable that both the load flanks on the pin connector and the load flanks on the box connector each have substantial planar engagement when the connection is fully made up, although there could be slight disparities between these flank angles, or the flank surfaces on the threads themselves may have a slightly different length. Similarly, substantially planar engagement is desired between the torque shoulder on the box member and the torque shoulder on the pin member, although again there could be a slight variance between these angles, e.g., typically less than 1 degree, due to machining tolerances. The load shoulders need not have the same radial length.

If the torque shoulder angle is of a higher magnitude, a wedge is formed between the load flank and torque shoulder which may convert the radial preload of the dope pressure into additional axial preload on the torque shoulder. If the torque shoulder angle is of a lower magnitude, a dovetail configuration is created which is addressed by the present invention. If the torque shoulder angle is parallel to or close to being parallel to the thread load flank, the preload should be substantially maintained. By providing the features disclosed herein, the oilfield tubular connection is able to maintain a relatively high breakout even if excess dope is trapped between the seals. The trapped dope increases hoop stress and radial separation of the connectors may occur, although when the excess dope pressure is relieved, the connection desirably returns to substantially its original form without a significant reduction in the initial preload. This is not possible when the load flanks on the connection and the torque shoulders on the connection effectively are at significantly different angles, and which effectively create a dovetail condition. According to one embodiment of the invention, the load flank angle of the threads and the torque shoulders are both at a negative angle, preferably within a slight differential, which allows the connection to energize axially as the distance between the load flanks and a torque shoulder increases as the radial separation of the pin and box decreases in response to decreased thread compound pressure.

Another potential advantage of the tapered torque shoulder, which applies to only the "negative" shoulder option, is to allow radial deflection of the connector under high compressive axial load which allows the stab flank clearances to close off. This in turn will add bearing area to carry the compressive load and prevent yielding of the shoulder. By making the shoulder less rigid, the stab flank clearances are able to close off and participate in carrying the compressive load before the torque shoulder bearing area yields. This radial deflection to allow said axial advance is made capable due to the radial component for the reaction force on the torque shoulder. This radial force is the result of the angled torque shoulder.

In another embodiment of the invention as shown in FIG. 4, the threaded connection 10 includes a pin member 1 and a box member 1, with a torque shoulder formed by the engagement of shoulder 20 of the box member and shoulder 26 of the pin member. The connection shown in FIG. 4 has two step tapered threads, but the invention of FIGS. 1-3 or FIG. 4 may also be used on a single-step tapered thread. FIG. 4 illustrates that the threads have a load flank 42 which is positive, and the torque shoulder formed by surfaces 26 and 28 is also positive. According to the present invention, these surfaces are controlled so that any variance between the load flank on one of the pin member or box member and the torque shoulder on the same 10 pin member or box member is less than about 5°, e.g., the load flank angle may be a positive 10°, and the torque shoulder may be a positive 9°. Each of the surfaces 26, 28 for this embodiment is at a perpendicular to positive angle, as indicated by the reference character 44, of from 0° to 15° and preferably less than 15°. FIG. 4 shows the torque shoulder spaced between the two step threads, although the torque shoulder alternatively may be provided at either end of the connection. Except for differences in the load flanks and torque shoulders, the connection may otherwise be as discussed above for the negative angle embodiment. The principles described herein might be applied to threaded and coupled connectors, single step connectors or connectors with only a single seal. Thread compound pressure can occur due to the internal seal in combination with a torque shoulder or restriction in threads independent of the existence of an external seal. Other connections with internal and external seal features are susceptible to overdoping and would also benefit from the present invention.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope. Whereas the present invention has been described in particular relation to the drawings attached hereto, it should be understood that other and further modifications apart from those shown or suggested herein, may be made within the scope and spirit of the present invention.

What is claimed is:

1. A threaded oilfield tubular connection, comprising:
a box connector having internal threads and a box torque shoulder not forming part of said internal threads; a pin connector having external threads for mating engagement with the internal threads and a pin torque shoulder for engagement with the box torque shoulder when the connection is made up;
each of the external threads and the internal threads having a thread load flank which is at a negative angle with respect to a central axis of the connection; and a stab flank; and each of the box torque shoulder and the pin torque shoulder are at a negative angle with respect to a central axis of the connection.

2. A threaded oilfield tubular connection as defined in claim 1, wherein each of the box connector and the pin connector includes two-step tapered threads, and each of the two-step tapered threads has the negative load flank.

3. A threaded oilfield tubular connection as defined in claim 2, wherein the box torque shoulder and the pin torque shoulder are spaced axially between the two-step threads on each of the box connector and the pin connector.

4. A threaded oilfield tubular connection as defined in claim 1, further comprising:
a pin seal surface adjacent a pin end of the pin connector for sealing engagement with the box connector when the connection is made up; and
a box seal surface adjacent a box end of the box connector for sealing engagement with the pin connector when the connection is made up.

5. A threaded oilfield tubular connection as defined in claim 1, wherein each of the thread load flank on the box connector and the pin connector, the box torque shoulder and the pin torque shoulder are at a negative angle with respect to the central axis of the connection with less than a 5° variance between the load flank and the torque shoulder on the respective pin connector or box connector.

6. A threaded oilfield tubular connection as defined in claim 5, wherein the thread flanks are angled at from 1° to 15°, and the box torque shoulder and the pin torque shoulder are each angled at from 1° to 20°, the torque shoulder angle being substantially equal to or greater than the load flank angle.

7. A threaded oilfield connection as defined in claim 1, wherein each of the box torque shoulder and the pin torque shoulder have a negative angle within 5° of the negative thread load flank on the box connector and the pin connector.

8. A threaded oilfield tubular connection as defined in claim 1, wherein each of the thread load flanks on the box connector and the pin connector is a negative angle less than 15°, and each of the box torque shoulder and pin torque shoulder have a negative angle of less than 20°.

9. A threaded oilfield tubular as defined in claim 1, wherein each of the stab flanks of the internal threads and the external threads is at a positive angle.

10. A threaded oilfield tubular connection as defined in claim 1, wherein the negative angles of the torque shoulder(s) and the negative angle of the load flanks have a slight angle disparity.

11. A threaded oilfield tubular connection as defined in claim 1, wherein the torque shoulder angle and the thread load flank angles are within 1° of one another.

12. A threaded oilfield tubular connection, comprising:
a box connector having internal threads and a box torque shoulder;
a pin connector having external threads for mating engagement with the internal thread, and a pin torque shoulder for engagement with the box torque shoulder when the connection is made up;
each of the external threads and the internal threads including two-step tapered threads having a thread load flank which is at an angle with respect to a central axis of the connection;
the box torque shoulder and the pin torque shoulder are spaced axially between the two-step threads on each of the box connector and the pin connector; and
each of the box torque shoulder and the pin torque shoulder at an angle with respect to a central axis of the connection with less than a 5° variance between the load flank and the torque shoulder on the respective pin connector or box connector.

13. A threaded oilfield tubular connection as defined in claim 12, further comprising:
a pin seal surface adjacent a pin end of the pin connector for sealing engagement with the box connector when the connection is made up; and
a box seal surface adjacent a box end of the box connector for sealing engagement with the connector when the connection is made up.

14. A threaded oilfield tubular connection as defined in claim 12, wherein each of the thread load flank on the box connector and the pin connector, the box load flank, the box torque shoulder and the pin torque shoulder are at an angle with less than a 5° variance between and any two of the angles.

15. A threaded oilfield tubular connection as defined in claim 14, wherein the thread load flanks are angled at a negative angle from 1° to 15°, and the box torque shoulder and the pin torque shoulder are each at a negative angle at from 1 to 20°, the torque shoulder angle being substantially equal to or greater than the load flank angle.

16. A threaded oilfield connection as defined in claim 12, wherein each of the box torque shoulder and the pin torque shoulder have a negative angle within 5° of the negative thread load flank on the box connector and the pin connector.

17. A threaded oilfield tubular connection comprising a box connector having internal, axially spaced tapered thread sets and a box torque shoulder; a pin connector having external, axially spaced tapered thread sets for mating engagement with the internal threads, and a pin torque shoulder, a step between the thread sets on each of the box connector and the pin connector, the box torque shoulder and the pin torque shoulder being respectively located on the step of the box connector and on the step of the pin connector, there being radial spacing between said thread sets, the threads on the box connector and the pin connector having a negative load flank angle with respect to a central axis of the connection, each of the box torque shoulder and pin torque shoulder being at a negative angle with respect to a central axis of the connection.

18. A threaded oilfield tubular connection, comprising a box connector having internal threads and a box torque shoulder not forming part of said internal threads; a pin connector having external threads for mating engagement with the internal threads and a pin torque shoulder for engagement with the box torque shoulder when the connection is made up, each of the external threads and the internal threads having a thread load flank which is at a negative angle with respect to a central axis of the connection, and a stab flank; each of the box torque shoulder and the pin torque shoulder being at a negative angle with respect to a central axis of the connection, the external threads and the internal threads extending substantially to the pin torque shoulder and box torque shoulder, respectively.

19. A threaded oilfield tubular connection, comprising:
a box connector having internal threads and a box torque shoulder not forming part of said internal threads; a pin connector having external threads for mating engagement with the internal threads and a pin torque shoulder for engagement with the box torque shoulder when the connection is made up;
each of the external threads and the internal threads having a thread load flank which is at a negative angle with respect to a central axis of the connection; and a stab flank; and each of the box torque shoulder and the pin torque shoulder are at a negative angle with respect to a central axis of the connection, whereby when the box connector and the pin connector are made up with pipe dope to a pre-load torque and said box torque shoulder and said pin torque shoulder are engaged, pipe dope trapped between engaged threads results in increased hydraulic pressure between the engaged threads and radial separation of the box connector and the pin connector, and as the increased hydraulic pressure is relieved, the negative angles of the engaged torque shoulders and load flanks convert the decreasing radial separation into increased interference between the engaged torque shoulders thereby resulting in a connection of equal or higher pre-load torque.

20. A threaded oilfield tubular connection, comprising:
a box connector having internal threads and a box torque shoulder;
a pin connector having external threads for mating engagement with the internal thread, and a pin torque shoulder for engagement with the box torque shoulder when the connection is made up;
each of the external threads and the internal threads including two-step tapered threads having a thread load flank which is at an angle with respect to a central axis of the connection;

the box torque shoulder and the pin torque shoulder are spaced axially between the two-step threads on each of the box connector and the pin connector;

each of the box torque shoulder and the pin torque shoulder at an angle with respect to a central axis of the connection with less than a 5° variance between the load flank and the torque shoulder on the respective pin connector or box connector;

a pin seal surface adjacent a pin end of the pin connector for sealing engagement with the box connector when the connection is made up; and a box seal surface adjacent a box end of the box connector for sealing engagement with a connector when the connection is made-up to a pre-load torque, whereby pipe dope used to make-up the connection is trapped between said pin seal surfaces and said box seal surfaces thereby increasing the pressure between the threads resulting in radial separation of the female threads and the male threads, said increased fluid pressure caused by said trapped dope is converted to torque shoulder interference as said dope pressure dissipates thereby preventing loss of preload.

* * * * *